United States Patent Office 2,834,719
Patented May 13, 1958

2,834,719

CATALYTIC CRACKING OF HYDROCARBON OILS

Robert B. Mosely, Lafayette, and George M. Good, Berkeley, Calif., assignors to Shell Development Company, New York, N. Y., a corporation of Delaware No Drawing. Application January 17, 1955
Serial No. 482,376

4 Claims. (Cl. 196—52)

This invention relates to the catalytic cracking of hydrocarbon oils to produce ionically cracked gasoline and more particularly to an improvement in such process through the use of a diluted catalyst affording increased yields of gasoline.

The catalytic cracking of hydrocarbon oils, as this term is used in the petroleum industry, refers to the splitting (cracking) of hydrocarbon oils into hydrocarbon products of lower molecular weight through the agency of a solid acidic catalyst. A widely used catalyst is the so-called natural or activated clay catalyst which is prepared by acid treatment of certain selected clays. The catalyst used under the trade name of Filtrol is a catalyst of this kind. More widely used, however, are the so-called synthetic catalysts which are made by properly combining silica and alumina. The alumina content may vary from about 5% to about 30% but is generally in the range between 12% and 25%. The exact way in which the silica and alumina are combined in the catalyst is not known. It is known, however, that these materials are combined and that a mere physical mixture of the components exerts no appreciable catalytic cracking effect. Other catalysts of the general type, which type is frequently referred to as clay-type cracking catalysts, are certain compounds of silica with magnesia, boric oxide with alumina, etc. These catalysts may or may not also contain small amounts of promoting materials such as halogen.

A characteristic of all of these cracking catalysts is that they have a large microporous surface having acidic centers. They crack hydrocarbons by an ionic mechanism, as contrasted to the free radical mechanism which is characteristic of thermal cracking. The ratio of isobutane to normal butane in the product is found to be a good yardstick by which to determine the relative amounts and strengths of acid centers responsible for the cracking taking place in any particular case.

In view of the much superior product distribution (greater concentration of iso-paraffins, greater amount of useful olefins, lower amount of gas, and higher octane number of the gasoline), it is highly desirable to effect the cracking as much as possible by the ionic mechanism and as little as possible by the free radical mechanism, i. e. to employ pure catalytic cracking to the exclusion of thermal cracking. This is accomplished in the catalytic cracking operations presently in use where the conventional catalytic cracking catalysts are used.

It is known that different cracking catalysts sometimes give slightly different product distributions and/or are somewhat more effective in cracking certain types of hydrocarbon oils than others and in some instances a physical mixture of particles of two different active cracking catalysts is somewhat superior to either one alone.

It has also been suggested to add to the active cracking catalyst discrete particles of an inert material to act as a diluent or a heat carrier. For this purpose such materials as sand, diatomaceous earth, kaolin, fused alumina, ground quartz, tripoli, burnt magnesia, powdered zirconia and the like have been recommended. Such materials may have some small cracking activity but such cracking as they may induce is of the undesired free radical type. It has therefore been recommended to use only such materials as have little or no porosity (inner surface) and little or no activity. These various materials act as inert diluent which lowers the activity in proportion to their concentration in the mixture. This results in lowering the gasoline yield.

It has been found, contrary to expectation, that the gasoline yield may be increased and other advantages gained by the use of a mixture of any of the conventional highly active cracking catalysts (or mixtures thereof) and an active silica gel. The term "active" in this latter case does not refer to catalytic activity, but refers to a silica gel having a microporous structure, affording a large available surface. It is preferred that the silica gel added to the active cracking catalyst be an active silica gel having an available surface of at least about 300 square meters per gram. It should not contain any appreciable amounts of alumina or magnesia to impart cracking activity, for then it simply becomes a poor cracking catalyst. The silica gels, designated grades 923 and 950 produced by the Davison Chemical Company, are suitable. While the usual silical gel is suitable, wide pored silica gels having an average pore diameter of at least 60 A. are preferred. Davison silica gel grade 70 is such a gel.

For reasons which will be later pointed out, it is also essential that the silica gel be used in such an amount that its available surface exceeds that of the cracking catalyst on the one hand, but, on the other hand, is less than about 8 times and preferably from 2 to 5 times this latter surface.

It is essential that the two materials be employed in a physical mixture such as produced by mixing the powdered cracking catalyst with powdered silica gel, or mixing pellets of the cracking catalyst with pellets of the silica gel. The silica gel may have the same particle size distribution as the cracking catalyst or it may have a larger or smaller average particle size.

Other forms of silica such as sand, diatomaceous earth, etc., do not afford the desired improvement as also such other materials as activated alumina, activated magnesia, and the like.

*Example*

A commercial synthetic silica-alumina cracking catalyst withdrawn from a commercial fluidized catalytic cracking plant and having the following inspection data:

| | |
|---|---|
| Specific surface | 100m.$^2$/g. |
| Al$_2$O$_3$ | 12.0%. |
| SiO$_2$ | 87.75%. |
| Impurities | 0.25%. |
| Size | Passes 100 mesh sieve. | was used to catalytically crack a West Texas flashed distillate having the following inspection data:

| | | |
|---|---|---|
| Gravity, ° API | | 28.5 |
| IBP | ° F | 435 |
| 50% | ° F | 668 |
| Sulfur | percent | 1.24 |
| Nitrogen | do | 0.082 |
| Oxygen | do | 0.18 |

The following conditions were used:

| | |
|---|---|
| Reactor | Fluid bed. |
| Temperature | 500° C. |
| Weight, hourly space velocity | 1.0. |
| Pressure | Atmospheric. |

The C$_5$–221° C. gasoline produced amounted to 32.3% by weight of the feed charged. The F–1 octane number of the gasoline containing 3 cc. of tetraethyl lead was about 99.

Separate portions of this cracking catalyst were mixed with different proportions of active silica gel having the following inspection data:

| | |
|---|---|
| Specific surface | 750 m.$^2$/g. |
| Size | Passes 100 mesh sieve. |
| $Al_2O_3$ | 0.009%. |
| Other impurities | 0.077%. | to give mixtures in which the ratios of silica surface to cracking catalyst surface were 2.5, 5.0, 7.5 and 11.25. The respective yields of $C_5$–221° C. gasoline under the same conditions were 32.3, 33.4, 33.8 and 33.6% by weight respectively, which correspond to increases in gasoline yields of about 0%, 3.4%, 4.6% and 4.0% by weight, respectively. The F–1 octane numbers of the gasolines with 3 cc. of tetraethyl lead were about 99, 99, 99, and 98, respectively. In addition, the coke production was reduced in each case.

The silica gel has a very low cracking activity per unit of surface (approximately only 5% of that of the active silica-alumina cracking catalyst). However, in view of the much greater surface per unit weight of the high surface silica gels, they show a cracking activity when used alone which may be as much as 35% on a weight basis of that of the active cracking catalyst. This cracking is, however, of the undesired free radical type and leads to large yields of gas and of a gasoline of low octane number. If the silica gel and active cracking catalyst contributed to the cracking in proportion to their expected activities it would therefore be impossible to obtain the improvement noted. It is surprising that in the proper mixture little if any free radical cracking is observed, the cracking pattern being essentialy ionic and effected only by the active cracking catalyst component. This is clearly shown, among other things, by the ratio of isobutane to normal butane in the products obtained. In the case of ionic cracking with the silica-alumina cracking catalyst this ratio is about 4.5. In the case of free radical cracking with silica gel, it is about 0.15. Thus, this ratio differs between the two materials by a factor of about 30. In the case of the mixtures shown above, this ratio was about 4.0 in all cases except the last in which case it was lower. This ratio of about 4.0, it will be noted, is substantially the same as that for the silica-alumina cracking catalyst alone and is totally different from that corresponding to the silica gel. The retention of the activity and of the high octane number in spite of the dilution should also be noted.

The favorable results noted are not obtained if the ratio of silica gel surface to cracking catalyst surface is increased too far. Thus, if this ratio of the surfaces exceeds about 8, the noted beneficial effect of the silica gel is lost and the expected detrimental effect of the silica gel becomes prominent; that is, the ratio of isobutane to n-butane quickly drops, the octane number of the gasoline begins to decline sharply, and also the yield of $C_5$–221° C. gasolines declines. Thus, in increasing the ratio of silica gel surface to cracking catalyst surface from 7.5 to 11.25, the isobutane to normal butane ratio dropped from 4.0 to about 2.2 and the octane number of the gasoline already began to decrease. Although the optimum gasoline yield occurred when the ratio of these surfaces was 7.5, it is recommended to maintain the ratio somewhat below this figure and preferably below 5, e. g. between about 2 and 5.

It will be understood that the invention is applicable with various active cracking catalysts under the general known cracking conditions using the various known techniques of contacting and handling the catalyst and products.

The available surface areas are those measured by nitrogen adsorption according to the so-called B. E. T. method (Brunauer, S., Emmett, P. H., and Teller, E., J. Am. Chem. Soc. 60, 309 (1938)). Ratios of the activities on a unit surface basis are measured in terms of weight hourly space velocities required to give a given conversion per square meter of available surface under otherwise the same conditions.

We claim as our invention:

1. In the catalytic cracking of a hydrocarbon oil to produce gasoline, the improvement which comprises contacting the oil to be cracked under cracking conditions with discrete particles of an active cracking catalyst and in admixture therewith discrete particles of silica gel having a microporous structure affording a large surface area the ratio of the latter to the former being such that the ratio of their available surfaces is between 1 and 8.

2. In the catalytic cracking of a hydrocarbon oil to produce gasoline, the improvement which comprises contacting the oil to be cracked under cracking conditions with discrete particles of an active cracking catalyst and in admixture therewith discrete particles of silica gel having a microporous structure affording a large surface area the ratio of the latter to the former being such that the ratio of their available surfaces is between 2 and 5.

3. In the catalytic cracking of a hydrocarbon oil to produce gasoline, the improvement which comprises contacting the oil to be cracked under cracking conditions with discrete particles of an active cracking catalyst and in admixture therewith discrete particles of silica gel having a microporous structure affording a large surface area and having an average pore diameter of at least 60 A. the ratio of the latter to the former being such that the ratio of their available surfaces is between 2 and 5.

4. A process in accordance with claim 1 wherein the cracking catalyst is a silica-alumina cracking catalyst.

References Cited in the file of this patent

UNITED STATES PATENTS

| | | |
|---|---|---|
| 2,361,987 | Swearingen | Nov. 7, 1944 |
| 2,369,001 | Ahlberg et al. | Feb. 6, 1945 |
| 2,400,176 | Thiele | May 14, 1946 |